US008399042B2

(12) United States Patent
Eskuchen et al.

(10) Patent No.: US 8,399,042 B2
(45) Date of Patent: Mar. 19, 2013

(54) WATER-DISPERSABLE STEROL CONTAINING DISPERSIONS

(75) Inventors: Rainer Eskuchen, Langenfeld (DE); Jörg Schwarzer, Hilden (DE); Peter Horlacher, Bellenberg (DE); Jürgen Gierke, Illertissen/Betlinshausen (DE); Robert Salacz, Senden (DE)

(73) Assignee: Cognis IP Management GmbH, Duesseldorf (DE)

( * ) Notice: Subject to any disclaimer, the term of this patent is extended or adjusted under 35 U.S.C. 154(b) by 346 days.

(21) Appl. No.: 12/746,626

(22) PCT Filed: Nov. 28, 2008

(86) PCT No.: PCT/EP2008/010111
§ 371 (c)(1),
(2), (4) Date: Jun. 7, 2010

(87) PCT Pub. No.: WO2009/071246
PCT Pub. Date: Jun. 11, 2009

(65) Prior Publication Data
US 2011/0097474 A1  Apr. 28, 2011

(30) Foreign Application Priority Data

Dec. 7, 2007 (EP) .................................... 07023796

(51) Int. Cl.
*A23D 7/00* (2006.01)
(52) U.S. Cl. ........................................ 426/611; 426/602
(58) Field of Classification Search .................... 426/611
See application file for complete search history.

(56) References Cited

U.S. PATENT DOCUMENTS

| 2,236,517 | A | * | 4/1941 | Cahn et al. ................. 426/73 |
| 4,071,544 | A | * | 1/1978 | Bade ............................ 554/166 |
| 4,169,102 | A | * | 9/1979 | Hameyer et al. ........... 554/166 |
| 6,391,370 | B1 | * | 5/2002 | Rogers et al. ............... 426/611 |
| 6,623,780 | B1 | | 9/2003 | Stevens et al. |
| 2004/0033202 | A1 | | 2/2004 | Cooper et al. |
| 2006/0029622 | A1 | * | 2/2006 | Floter et al. ................. 424/400 |

FOREIGN PATENT DOCUMENTS

| EP | 1142494 A1 | 10/2001 |
| EP | 0897671 B1 | 9/2002 |
| WO | 0217892 A2 | 3/2002 |
| WO | 02065859 A1 | 8/2002 |
| WO | 03005611 A2 | 1/2003 |
| WO | 03055324 A1 | 7/2003 |
| WO | 2005053414 A1 | 6/2005 |
| WO | 2006069619 A2 | 7/2006 |

* cited by examiner

*Primary Examiner* — Carolyn Paden
(74) *Attorney, Agent, or Firm* — Servilla Whitney LLC

(57) ABSTRACT

The invention relates to aqueous dispersions containing (a) 5 to 50% by weight of sterols and/or stanols; and (b) 0.5 to 20% by weight of citric acid esters of mono- and/or diglycerides, based on the total weight of the dispersion, wherein the citric acid esters of mono- and/or diglycerides are partially neutralised; and to a process for the production of an aqueous sterol/stanol-containing dispersion, which process comprises (a) dissolving citric acid esters of mono- and/or diglycerides that are partly neutralised, in water; (b) dispersing sterols and/or stanols in the emulsifier solution to form a pre-dispersion; and (c) grinding the pre-dispersion in a ball-mill until the dispersion has a particle mass diameter, $d_{90}$, of less than 5 µm. Optionally, this dispersion is spray-dried.

12 Claims, No Drawings

WATER-DISPERSABLE STEROL CONTAINING DISPERSIONS

CROSS-REFERENCE TO OTHER APPLICATIONS

This application is the National Stage entry of PCT/EP2008/010111, filed Nov. 28, 2008, which claims priority to European application number 07023796, filed Dec. 7, 2007, both of which are incorporated herein by reference in their entireties.

FIELD OF THE INVENTION

This invention relates generally to foods and, more particularly, to compositions containing sterols, stanols and/or esters thereof for incorporation in foods, cosmetic and pharmaceutical preparations, to a process for their production and to preparations, more particularly foods, which contain these compositions.

BACKGROUND OF THE INVENTION

Phytosterols and their derivatives hardened by hydrogenation, phytostanols, have been known for many years for their cholesterol-lowering properties. As early as 1991, researchers demonstrated the effectiveness of these substances in inhibiting the absorption of cholesterol in the intestine and through the inner blood vessel walls. Accordingly, sterols and stanols are widely used in the food industry because, through their hypocholesterolaemic effect, they minimize future diseases, such as atherosclerosis, heart disease and hypertension. Since phytosterols and stanols are insoluble in water and only poorly soluble in fats and oils, the incorporation of these cholesterol-lowering agents in food preparations, cosmetic or pharmaceutical products poses considerable problems. The unfavourable solubility behaviour of the substances results not only in poor dispersibility, but also in reduced bioavailability and in unsatisfactory stability of the food preparations.

Efforts to solve this problem have included the formulation of small particle sizes, mainly by micronization. However, the micronization of the sterol particles is not in itself sufficient to enable satisfactory incorporation into food products. Although the bioavailability of the finely dispersed particles can be improved by increasing the surface area, the micronized particles show poor wetting behaviour, readily aggregate, and generally float on the surfaces of aqueous dispersions. In many cases, the ground sterol can only be dispersed in a beverage by special methods involving intensive mixing. However, intensive mixers are not normally available to the end user of the food manufacturers.

Accordingly, many manufacturers combine micronization of the sterols with the additional use of emulsifiers.

European patent EP 0897671 B1 claims food especially beverages containing aqueous suspensions or dispersions with sterols and sterol esters having a particle size of 15 micron or lower and a non-sterol emulsifier in a weight ratio emulsifier to sterol of less than 1:2. The non-sterol emulsifier could be monoglycerides, diglycerides, polysorbates, sodium stearyl lactylate or polyglycerol esters.

In US 20040033202 A1 the applicant has claimed a composition comprising: (a) particles of at least one sterol or a salt thereof, wherein the sterol particles have an effective average particle size of less than about 2000 nm; and (b) at least one surface stabilizer. The suggested emulsifiers, especially polysorbates are claimed as surface stabilisers in this application.

International application WO 2002/065859 A1 discloses a method of dispersing phytosterol in an aqueous phase, which comprises mixing particulate phytosterol with an aqueous phase in the presence of a non-sterol emulsifier having a HLB value higher than that of the phytosterol to create an aqueous phytosterol dispersion, such that the combined HLB value of the non-sterol emulsifier and the phytosterol in the aqueous phase does not exceed 8.

U.S. Pat. No. 6,623,780 B1 claims compositions with sterols, monoglycerides and polysorbates in a defined weight ratio having a particle size smaller than one micron when dispersed in water. Compositions containing one part sterol to 1.14 to 1.5 parts monoglycerides and 0.04 to 0.2 parts polysorbate are protected as well as the process of preparing a beverage containing these ingredients.

Not only the addition of surfactants, but also manufacturing steps should improve water-dispersibility of the sterol particles.

WO2003105611 A2 claims a process for producing a plant sterol dispersion, which requires a heating step, the dispersion containing sterols which is just characterised by the particle size distribution from 0.1 to 30 µm.

A method of forming a plant sterol-emulsifier dispersion for use in a food product, including micromilling at, or close to, or below ambient temperature to form the plant sterol-emulsifier dispersion, wherein the average particle size of the plant sterol-emulsifier dispersion is about 1 to about 40 microns is claimed in the European application EP 1142494 A1. In addition it claims the plant sterol-emulsifier dispersion with having an average particle size of about 1 to about 40 microns.

The particle size of the micronised sterol particles should be as small as possible in order to have a large surface area, so that availability of the sterol could be improved.

Often the addition of a surfactant is sufficient to achieve a better water-dispersibility of the micronised sterol particles, but further processing of the dispersion and incorporation in food formulations is unsatisfactory as the nature of the chosen surfactant greatly influences the characteristics of the sterol particle containing dispersion.

The problem addressed by the present invention was to provide a formulation which would allow the effective dispersion and incorporation of sterols, stanols and esters thereof in foods especially beverages while using simple equipment. The sterol formulation would be readily produced and would be distinguished by high stability in storage.

DETAILED DESCRIPTION OF PREFERRED EMBODIMENTS

The present invention relates to aqueous dispersions containing:
a) 5 to 50% by weight sterols and/or stanols; and
b) 0.5 to 20% by weight citric acid esters of mono- and diglycerides, based on the total weight of the dispersion.

With the suggested dispersion it is possible to include strongly hydrophobic sterols/stanols into a hydrophilic environment like all kinds of beverages (e.g. milk based, soy based, juices, coffee, sports beverages) or food in general. Due to the special combination of food emulsifier and process equipment it is possible to produce a stable dispersion with a high ratio sterols/stanols over emulsifier.

The aqueous dispersions contain particles with a particle mass diameter of $d_{90}$ less than 5 µm, preferably less than 2 µm and most preferably less than 1 µm determined by laser diffraction.

Because of the fineness of the dispersion sedimentation or flotation does not occur. The small particle size results in a convenient mouthfeel, sandiness or other negative properties are avoided. Usually dispersions of this fine particle size distribution have a very negative processability. Surprisingly the use of citric acid esters of mono- and diglycerides as emulsifier results in dispersion with a very good flowability despite the small particle size distribution.

The emulsifier is preferably a partly neutralised citric acid ester such as Lamegin ZE 609 (from Cognis GmbH). Usual types of citric acid esters of mono- and diglycerides are acidic. Surprisingly especially dispersions of sterols with partly neutralised citric acid esters of mono- and diglycerides have very good flowability.

The amount of citric acid esters of mono- and diglycerides in the aqueous dispersion is less than the amount of sterols and stanols. Preferably the sterol content of the dispersion is from 10% to 30%, more preferably from 20 to 25%, while the amount of citric acid esters of mono- and diglycerides is from 2% to 10% and most preferably from 5% to 8% based on the weight of the dispersion.

The aqueous dispersions according to the invention are obtainable by
a) dissolving citric acid esters of mono- and diglycerides in water
b) dispersing sterols and/or stanols in the emulsifier solution to form a pre-dispersion
c) grinding the pre-dispersion in a ball-mill until the dispersion has a particle mass diameter $d_{90}$ of less than 5 µm, preferably less than 2 µm and most preferably less than 1 µm.

The emulsifier (citric acid esters of mono- and diglycerides) is dissolved in hot water and cooled to 30° C. Sterols/stanols are coarsely dispersed in the emulsifier solution to form a pre-dispersion. The particle size of the untreated sterols before the production of the aqueous dispersions in step b) is not crucial to the final formulation, which considerably simplifies processing. However, the time of processing can significantly be reduced when using ground sterols and/or stanols having a mean particle size of less than 100 µm determined by laser diffraction. Grinding in the ball-mill can be conducted as batch process or as continuous process. Preferably the ball-mill has a ball size between 0.4 and 1.4 mm, preferably between 0.4 and 0.7 mm.

After grinding further processing can be conducted by spray-drying the ground dispersion. The dispersion can be spray dried, with or without the addition of polysaccharides. Redispersion in water gives still a very fine dispersion with almost the same properties as the original dispersion.

Accordingly the present invention also relates to dry powders containing sterols and/or stanols and citric acid esters of mono- and diglycerides at a weight ratio between 1:0.99 sterols and/or stanols to citric acid esters of mono- and diglycerides and 1:0.01 sterols and/or stanols to citric acid esters of mono- and diglycerides as the amount of sterols and/or stanols is always higher than the amount of citric acid esters of mono- and diglycerides.

Preferably the dry powder contains sterols and/or stanols and citric acid esters of mono- and diglycerides at a weight ratio between 1:0.6 and 1:0.1 and most preferably at a weight ratio between 1:0.4 and 1:0.2.

This spray-dried powder has a very good homogeneity and is easily redispersed in water or any aqueous dispersing agent. These dispersing agents could be food compositions directly such as fruit-juice or diary based liquids or aqueous solutions of vitamins, minerals and other water soluble additives.

So that another object of the invention is a process for the production of an aqueous sterol/stanol containing dispersion, which process comprises
a) dissolving citric acid esters of mono- and diglycerides in water
b) dispersing sterols and/or stanols in the emulsifier solution to form a pre-dispersion
c) grinding the pre-dispersion in a ball-mill until the dispersion has a particle mass diameter $d_{90}$ of less than 5 µm,
d) spray-drying the resulting aqueous dispersion and optionally
e) dissolving the spray-dried sterol/stanol containing powder in water or an aqueous dispersing agent.

Food products comprising the aqueous dispersions according to the invention could be any water containing food composition especially milk, milk beverages, whey and yoghurt beverages, fat spreads, fruit juices, fruit juice mixtures, fruit juice beverages, vegetable juices, carbonated and still beverages, soya milk beverages or high-protein liquid food substitute beverages and fermented milk preparations, yoghurt, drinking yoghurt or cheese preparations, as well as cosmetic or pharmaceutical preparations.

Sterols, Stanols and Esters Thereof.

Sterols obtained from plants and vegetable raw materials, so-called phytosterols and phytostanols, and esters of the phytosterols and esters of the phytostanols are used for the purposes of the invention. Known examples are ergosterol, brassica sterol, campesterol, desmosterol, clionasterol, stigmasterol, poriferasterol, chalinosterol, sitosterol and mixtures thereof. Of these, β-sitosterol and campesterol are preferably used. The hydrogenated saturated forms of the sterols, so-called stanols, are also included among the compounds used, β-sitostanol and campestanol likewise being preferred. In addition, esters of the phytosterols and esters of the phytostanols are used in the formulations according to the invention. These derivatives of the sterols and stanols are also not sufficiently hydrophilic and wettable to be readily incorporated into foods or other preparations. Esterification products with saturated and/or unsaturated $C_{6-22}$, and preferably $C_{12-18}$ or $C_8/C_{10}$ fatty acids are used, although the invention is not limited to esters of this type. However, unesterified sterols, which contain small quantities of stanols from their production, are particularly preferred.

Particle Size Distribution

The particle size determination was carried out by laser diffraction. The particle size distribution was determined with a Beckman Coulter LS 230 particle size analyzer (1994 operating instructions). Water was used as the measuring medium. The particle sizes of the final formulations were measured immediately after preparation of the dispersions.

Formulations for Sterol-Containing Dispersions with Citric Acid Esters of Mono- and Diglycerides:

Compositions according to the invention include, but are not limited to, the following, and shall be understood to include "mixtures thereof" of the components a) and b), respectively:
A) Aqueous dispersion containing
  a) 5 to 50% by weight sterols and/or stanols; and
  b) 0.5 to 20% by weight citric acid esters of mono- and diglycerides, based on the total weight of the dispersion.

By virtue of their improved mouthfeel, dispersibility and processability in foods, the following aqueous dispersion formulations are preferred:
B) Aqueous dispersion containing
  a) 10 to 30% by weight sterols and/or stanols; and
  b) 2 to 10% by weight citric acid esters of mono- and diglycerides, based on the total weight of the dispersion.

Solids dispersions having the following composition are particularly preferred:

C) Aqueous dispersion containing
   a) 10 to 30% by weight sterols and/or stanols; and
   b) 5 to 8% by weight citric acid esters of mono- and diglycerides, based on the total weight of the dispersion.

Emulsions having the following composition are especially preferred:

D) Aqueous dispersion containing
   a) 20 to 25% by weight sterols and/or stanols; and
   b) 5 to 8% by weight citric acid esters of mono- and diglycerides, based on the total weight of the dispersion.

The following examples are illustrative of, but not limiting of, the present invention.

EXAMPLES

Example 1

Batch Grinding 11.3 g of citric acid esters of mono- and diglycerides (LAMEGIN® ZE 609, Cognis GmbH) are dissolved in 99 g of water. In this solution 40 g of pre-ground plant sterols (GENEROL® 122 NG, Cognis GmbH, $d_{50}$ 8 µm as determined by laser diffraction) are dispersed and another 27 g of water are added. The dispersion is put in to a chilled lab ball mill (Lehmann FML 2 liter) and ground for 30 min with balls from 0.4 to 0.7 mm. The particle size distribution of the dispersed sterol particles was characterized by the following diameters: $d_{10}$=0.10 µm, $d_{50}$=0.25 µm, $d_{90}$=0.48 µm, $d_{32}$=0.19 µm. It was determined with a Beckman Coulter LS 230 particle size analyzer (1994 operating instructions). Water was used as the measuring medium.

Example 2

Continuous Grinding

A pre-dispersion with 23 wt % sterols 6.5 wt % citric acid esters of mono- and diglycerides (LAMEGIN® ZE 609, Cognis GmbH) and 70.5 wt % water was prepared by dissolving the emulsifier at 70° C. cooling it to 30° C., mixing in the ground plant sterols ($d_{50}$≈8 µm). The pre-dispersion was processed through a ball mill (Lehmann FML, balls 0.4-0.7 mm) seven times at 1750 U/min and with a feed rate of 12 kg/h. The particle size distribution of the final dispersion was characterized by the following diameters: $d_{10}$=0.10 µm, $d_{50}$=0.28 µm, $d_{90}$=0.58 µm, $d_{32}$=0.21 µm.

Example 3

Continuous Grinding 7000 grams of a pre-dispersion with 23% sterols 6.5% citric acid esters of mono- and diglycerides (LAMEGIN® ZE 609, Cognis GmbH) and 70.5% water were prepared by dissolving the emulsifier at 70° C. cooling it to 30° C., mixing in the ground plant sterols ($d_{50}$≈8 µm). The pre-dispersion was circulated through a ball mill (Lehmann FML, balls 0.4-0.7 mm) for 2.5 hrs times at 1750 U/min and with a feed rate of 12 kg/h. The particle size distribution of the final dispersion was characterized by the following diameters: $d_{10}$=0.11 µm, $d_{50}$=0.31 µm, $d_{90}$=0.72 µm, $d_{32}$=0.32 µm.

Example 4

Spray Dried Dispersions

A pre-dispersion with 20% sterols 7.5% citric acid esters of mono- and diglycerides (LAMEGIN® ZE 609, Cognis GmbH) and 72.5% water was prepared by dissolving the emulsifier at 80° C., mixing in the ground plant sterols ($d_{50}$≈20 µm) and cooling it to 30° C. The pre-dispersion was processed through a lab ball mill (balls 0.7-1.2 mm) once. The particle size distribution of the dispersion was characterized by the following diameter $d_{32}$=0.53 µm.

A first portion of this dispersion was spray-dried as such in a lab spray tower (Niro Mobile Minor™ 2000). A free flowing powder with a sterol content of 73% was formed. Remixing the powder with water led to a dispersion characterized by the following diameter $d_{32}$=0.79 µm. This means the original ratio of surface to mass which influences the availability of the material was almost preserved.

A second portion of this dispersion was spray-dried after adding 20% dextrin (CRYSTAL TEX® 626) in a lab spray tower (Niro Mobile Minor™2000). A free flowing powder with a sterol content of 42% was formed. The flowing properties were apparently improved compared to the sample without dextrin. Remixing the powder with water led to a dispersion characterized by the following diameter $d_{32}$=0.77 µm. This means the original ratio of surface to mass which influences the availability of the material was almost preserved.

Example 5

Application

Samples of the plant sterol dispersion of Example 2 were formulated in different beverages (milk mix drinks, orange juice, banana nectar, coffee, sports drinks) up to a sterol content of 0.7%. The sterol/citric acid esters of mono- and diglycerides dispersion was thoroughly wetted by the liquid. The formulations were stable with minimum sedimentation and had a pleasant mouthfeel without sandiness.

Other Emulsifiers

Examples 1 and 2 were repeated with the following emulsifiers:

Diacetyl tartaric acid esters of mono- and diglycerides (DATEM, GAMMEX® 701, Cognis GmbH)
Lecithin (Premium IPM, Cargill)
Polyglycerolester Riken (POEM J-0381 V, Riken),
Sodium Stearoyl-Lactylate (PREFERA® SSL, Cognis GmbH),
Glucosedistearate (Sisterna SP 70, Sisterna B.V.)
Polysorbate (LAMESORB® SMO 20, Cognis GmbH)

None of these emulsifiers resulted in a sterol containing dispersion with the desired fine particle size and an acceptable flow behaviour. In case that the same particle size distribution as with citric acid esters of mono- and diglycerides was achieved, these dispersions were not capable of flowing any more.

What we claim is:

1. An aqueous dispersion comprising:
   a) 5 to 50% by weight of sterols and/or stanols; and
   b) 0.5 to 20% by weight of citric acid esters of mono- and/or diglycerides, based on the total weight of the dispersion, wherein said citric acid esters of mono- and/or diglycerides are partially neutralised.

2. The aqueous dispersion of claim 1, wherein the particle mass diameter of the dispersion $d_{90}$, is less than 5 µm, as determined by laser diffraction.

3. The aqueous dispersion of claim 2, wherein the particle mass diameter of the dispersion, $d_{90}$, is less than 1 µm, as determined by laser diffraction.

4. The aqueous dispersion of claim 1, wherein the amount of citric acid esters of mono- and/or diglycerides is less than the amount of sterols and stanols.

5. A food product comprising the aqueous dispersion of claim 1.

6. A process for the production of an aqueous sterol/stanol-containing dispersion, which process comprises the steps of:
   a) dissolving citric acid esters of mono- and/or diglycerides that are partially neutralized, in water to form an emulsifier solution;
   b) dispersing sterols and/or stanols in said emulsifier solution to form a pre-dispersion; and
   c) grinding said pre-dispersion in a ball-mill until the dispersion has a particle mass diameter $d_{90}$, of less than 5 µm.

7. The process of claim 6, wherein said sterols and/or stanols of step b) have a mean particle size of less than 100 µm, as determined by laser diffraction.

8. The process of claim 6, wherein said ball-mill has a ball size of between 0.4 and 1.4 mm.

9. The process of claim 6, wherein said grinding step c) is conducted in a batch process.

10. The process of claim 6, wherein said grinding step c) is conducted in a continuous process.

11. A process for the production of a sterol/stanol-containing composition, which process comprises the steps of:
    a) dissolving citric acid esters of mono- and/or diglycerides that are partly neutralised, in water to form an emulsifier solution;
    b) dispersing sterols and/or stanols in said emulsifier solution to form a pre-dispersion;
    c) grinding said pre-dispersion in a ball-mill until the dispersion has a particle mass diameter $d_{90}$ of less than 5 µm, to form a ground aqueous dispersion;
    d) spray-drying said ground aqueous dispersion, to form a sterol/stanol-containing powder; and
    e) optionally, dissolving said spray-dried sterol/stanol-containing powder in water or an aqueous dispersing agent.

12. A dry powder resulting from steps a)-d) of the process of claim 11, containing sterols and/or stanols and citric acid esters of mono- and/ or diglycerides at a weight ratio of between 1:0.99 to 1:0.01.

* * * * *